(12) United States Patent
Hall et al.

(10) Patent No.: US 10,214,096 B1
(45) Date of Patent: Feb. 26, 2019

(54) AIR INTAKE FILTER HOUSING

(71) Applicants: David R. Hall, Provo, UT (US); Stephen R. Hall, Draper, UT (US)

(72) Inventors: David R. Hall, Provo, UT (US); Stephen R. Hall, Draper, UT (US)

(73) Assignee: Hall Labs LLC, Provo, UT (US)

( * ) Notice: Subject to any disclaimer, the term of this patent is extended or adjusted under 35 U.S.C. 154(b) by 456 days.

(21) Appl. No.: 15/082,510

(22) Filed: Mar. 28, 2016

(51) Int. Cl.
| | |
|---|---|
| *B60K 13/02* | (2006.01) |
| *B62D 25/10* | (2006.01) |
| *B62D 65/02* | (2006.01) |
| *F02M 35/02* | (2006.01) |
| *F02M 35/024* | (2006.01) |
| *F02M 35/10* | (2006.01) |

(52) U.S. Cl.
CPC ............ *B60K 13/02* (2013.01); *B62D 25/105* (2013.01); *B62D 65/02* (2013.01); *F02M 35/0204* (2013.01); *F02M 35/024* (2013.01); *F02M 35/10* (2013.01)

(58) Field of Classification Search
CPC ...... B60K 13/02; B62D 25/10; B62D 25/105; B62D 25/12; B62D 65/02; F02M 35/0204; F02M 35/024; F02M 35/02416; F02M 35/10; F02M 35/10006

USPC ....................................................... 180/68.3
See application file for complete search history.

(56) References Cited

U.S. PATENT DOCUMENTS

| | | | | |
|---|---|---|---|---|
| 2,701,024 | A * | 2/1955 | Thomas | B62D 25/105 180/68.3 |
| 3,249,172 | A * | 5/1966 | De Lorean | B62D 25/12 180/68.3 |
| 3,800,910 | A * | 4/1974 | Rose | F02M 35/1272 181/229 |
| 4,778,029 | A * | 10/1988 | Thornburgh | F02M 35/14 180/68.3 |
| 5,579,858 | A * | 12/1996 | Petersen | B60K 13/02 180/68.3 |
| 9,744,921 | B2 * | 8/2017 | Yamaguchi | B62D 25/105 |
| 9,822,741 | B2 * | 11/2017 | Holzmann | F02M 35/161 |
| 2006/0048986 | A1 * | 3/2006 | Bracciano | B60H 1/28 180/69.2 |

* cited by examiner

Primary Examiner — John D Walters

(57) ABSTRACT

An air filter housing for is disclosed. The air filter housing is created by a base filter section and a top filter section. The top filter section is a hood of a vehicle. This allows the filter to be changed and inspected by simply lifting up the vehicle hood. Air channels are formed in a bottom portion of a two-layer hood allowing air to be delivered to the air intake of a combustion engine. The hood interfaces with the base filter housing section and seals the filter by pressure created by the hood.

20 Claims, 6 Drawing Sheets

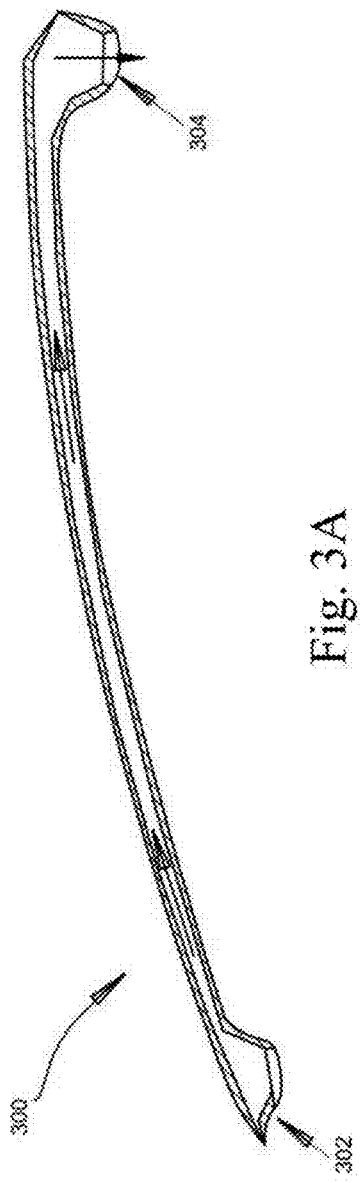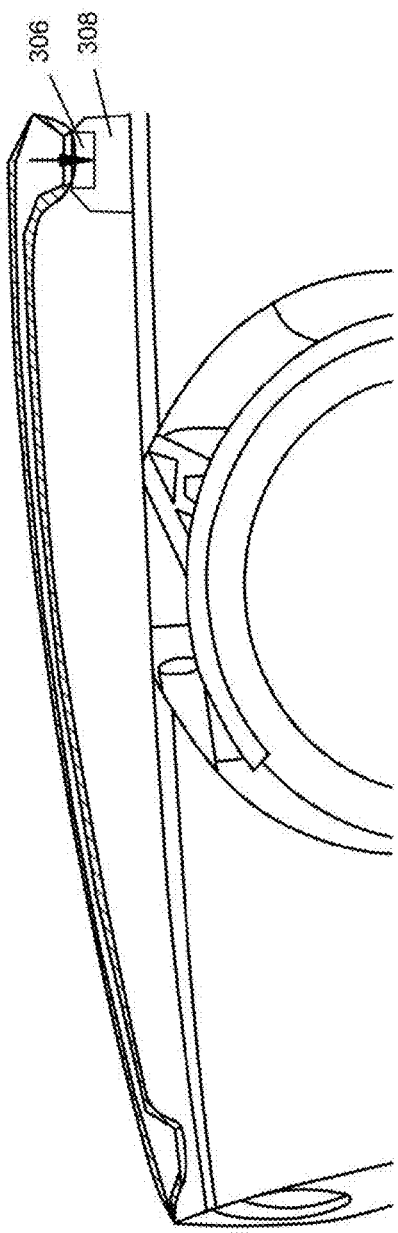
Fig. 3A
Fig. 3B

AIR INTAKE FILTER HOUSING

BACKGROUND

Field of the Invention

This invention relates to air filter housings used in vehicles with combustions engines.

Background of the Invention

Air filters need to be replaced in combustion engines on a regular basis. Replacing a clogged or dirty air filter on a vehicle can improve vehicle performance and fuel economy. When air filters are not changed, fuel consumption increases, harmful emissions increase and engine wear increases. It is not common for a vehicle owner to replace his or her own air filter because of the complexity of changing the air filter. Air filters are trapped inside of an air filter housing which requires tools and knowledge on where to look and what to do to replace or inspect the filter. Thus inspection and/or replacement of an air filter is prohibitive for most vehicle owners.

Air filter housings are known in the art such as is disclose in U.S. Pat. No. 5,564,513 to Wible et al. Wible teaches a filter housing which contains an upper and lower housing portion. Wilbe's filter housing fails to make the filter able to be serviced be a common owner of a vehicle. The filter housing is located beneath the hood and in front of the radiator making it hard to find and cumbersome to get to.

Greeson, U.S. Pat. No. 6,565,620, teaches an internally sourced engine air intake filtration arrangement which filters both cabin air and combustion air with the same filter. This filter does not solve the problem of being able to replace a combustion air filter without any tools and by a common vehicle owner.

SUMMARY

The disclosed invention has been developed in response to the present state of the art and, in particular, in response to the problems and needs in the art that have not yet been fully solved by currently available air filter housings. Accordingly, an air filter housing and methods in accordance with the invention have been developed to provide improved simplicity in inspection and replacement of an air filter. The features and advantages of the invention will become more fully apparent from the following description and appended claims, or may be learned by practice of the invention as set forth hereinafter.

An air filter housing for is disclosed. The air filter housing is created by a base filter section and a top filter section. The top filter section is a hood of a vehicle. This allows the filter to be changed and inspected by simply lifting up the vehicle hood. Air channels are formed in a bottom portion of a two-layer hood allowing air to be delivered to the air intake of a combustion engine. The hood interfaces with the base filter housing section and seals the filter by pressure created by the hood.

Consistent with the foregoing, an air filter housing which is assembled and disassembled by opening and closing a hood of a combustion vehicle is disclosed. Allowing a common vehicle owner to inspect and replace a combustion air filter of a vehicle without any tools or without moving any fixed portions of a vehicle which are under the hood. A corresponding method is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings.

FIG. 3A is cross-sectional views of a combustion engine vehicle hood.

FIG. 3B is a cross-section view of a combustion engine vehicle hood in a closed position on a combustion engine vehicle.

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
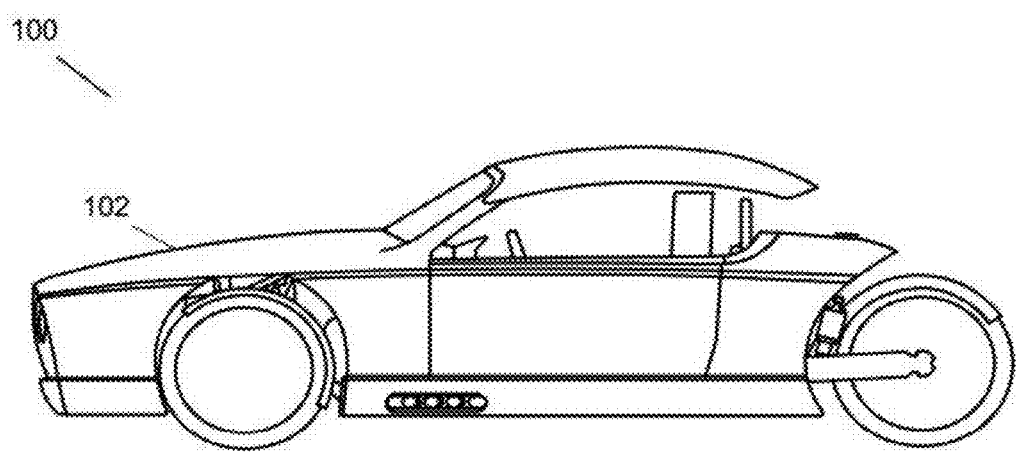
FIG. 1 is a side view of a combustion engine vehicle.

Referring to FIG. 1, a combustion engine vehicle 100 is shown with a closed hood 102. The vehicle shown is not limiting on the scope of the claimed invention but is a mere illustration of a generic combustion engine vehicle. The vehicle may be a motorcycle, aircraft, watercraft, car, van, bus, spacecraft, tractor, ATV, etc. The closed hood 102 serves as a top filter housing for an air filter 224 shown in FIG. 2 and as a hood for the combustion engine beneath the hood. The term "vehicle hood" as shown at 102 will hereinafter be referred to as a "hood" and/or a "top filter housing section". A hood may refer to a covering of a combustion engine in the front of a vehicle or a covering of a combustion engine in the back of a vehicle. Both apply equally to the disclosure and claims contained herein.

Figure 2:
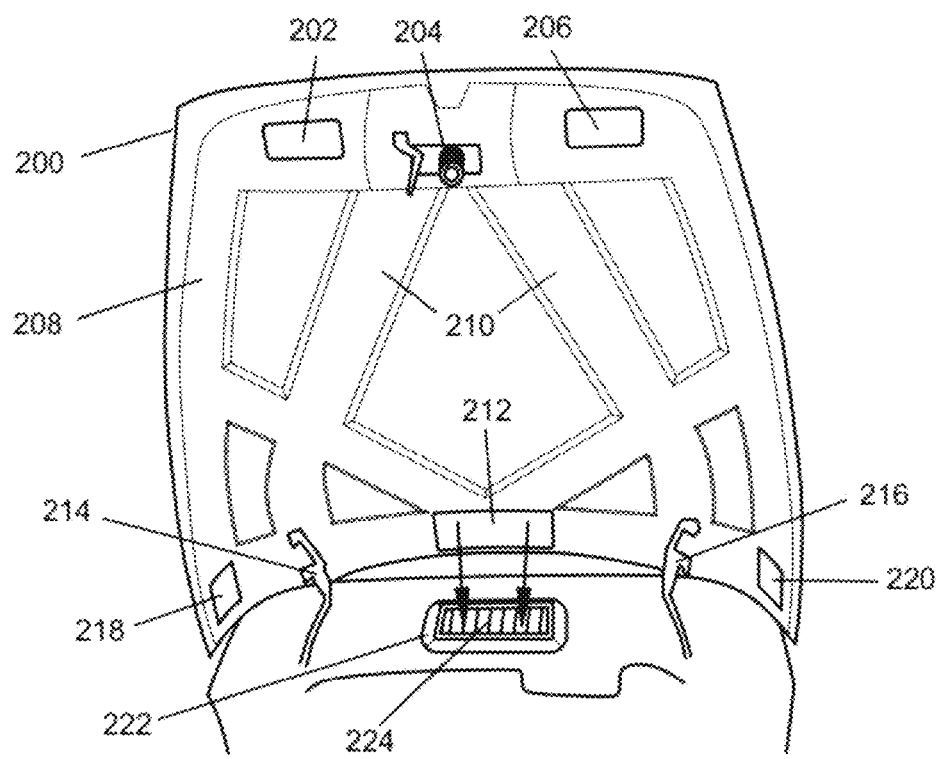
FIG. 2 is a front view of a combustion engine vehicle with a lifted hood.

Referring now to FIG. 2, an open combustion engine vehicle hood is shown. The hood is made of a top layer 200 and a bottom layer 208 and 210. The bottom layer and the top layer form one or more air ducts 208 and 210. The top layer is shown clearly in FIG. 1 at 102 and is the finished, painted, top side of the hood. The hood is connected to the vehicle body by hinges 214 and 216. These hinges rotate and lift the hood upward and away from the vehicle when the hood is opened. The air ducts 208 and 210 have two or more openings 218, 220, 212, 202 and 206. Air duct opening 212 supplies air to an inside area of the base filter housing section 222 when the hood is closed. A filter 224 sits inside of an area formed by the base filter housing 222. Air duct opening 212 may be integrally formed into the hood and may be made by cutting a hole in a bottom hood layer air duct 208 or 210. The hood serves as a top filter housing which interfaces with the base filter housing section 222 and covers the air filter 224 when the hood is closed. When the hood is open, the top filter housing section is removed as the hood is lifted up and rotated away from the base filter section 222. This makes changing and inspecting the air filter 224 easy for an owner of vehicle 100. Additionally, one or more air duct openings 218, 220, 212, 202 and 206 may be mechanically and pneumatically disconnected from the filter 224 and the base filter section 222 when the hood is open. Air duct openings 218 and 220 may be formed on an inside or bottom surface of hood 102. The air ducts 218, 220, 212, 202 and 206 may be hidden on a bottom side of the hood when the hood is closed. All of the air ducts may be facing the engine on a bottom surface of the hood. Air duct openings 202 and 206 may be used to create a pressurized air input from the front of a vehicle as shown in FIG. 3A. The hood may be shaped to create added air pressure into air ducts 208 and 210 when vehicle 100 is moving. Air duct openings 218, 220, 202 and 206 are configured to connect to and draw air from an atmospheric air supply found around a vehicle. Any number of air duct openings may be used or formed in an air duct. Air ducts opening may also be positioned in any location along an air duct formed in the hood. Air duct openings may be formed by making a hole in an air duct. The air ducts 208 and 210 are formed on one side by a bottom layer of the hood and on the other side by a top layer of the hood. The two layers of the hood may be formed in various shapes and dimensions allowing air channels to be formed thereby. The two layers of the hood provide rigidity and air channels to be designed in the hood. Because of the rigidity and the air channels formed therein, the hood able to be used as a top filter housing section of a combustion engine air intake.

In FIG. 3A, a hood 300 is shown with a pressurized air opening 302 at the front of the hood. The pressurized flow is created as air moves past air opening 302 while the vehicle is moving. The pressurized flow follows an air channel and exits at 304. In FIG. 3B, we see a closed hood on a vehicle forming a top filter housing. Filter 306 is enclosed in a filter housing with the hood forming a top filter housing section and 308 forming a bottom filter housing section. When the hood is closed, the filter 306 is securely held in place. When the hood is open the filter can be easily inspected for discoloration or replaced without the need of tools or removing any other coverings.

Figure 4:
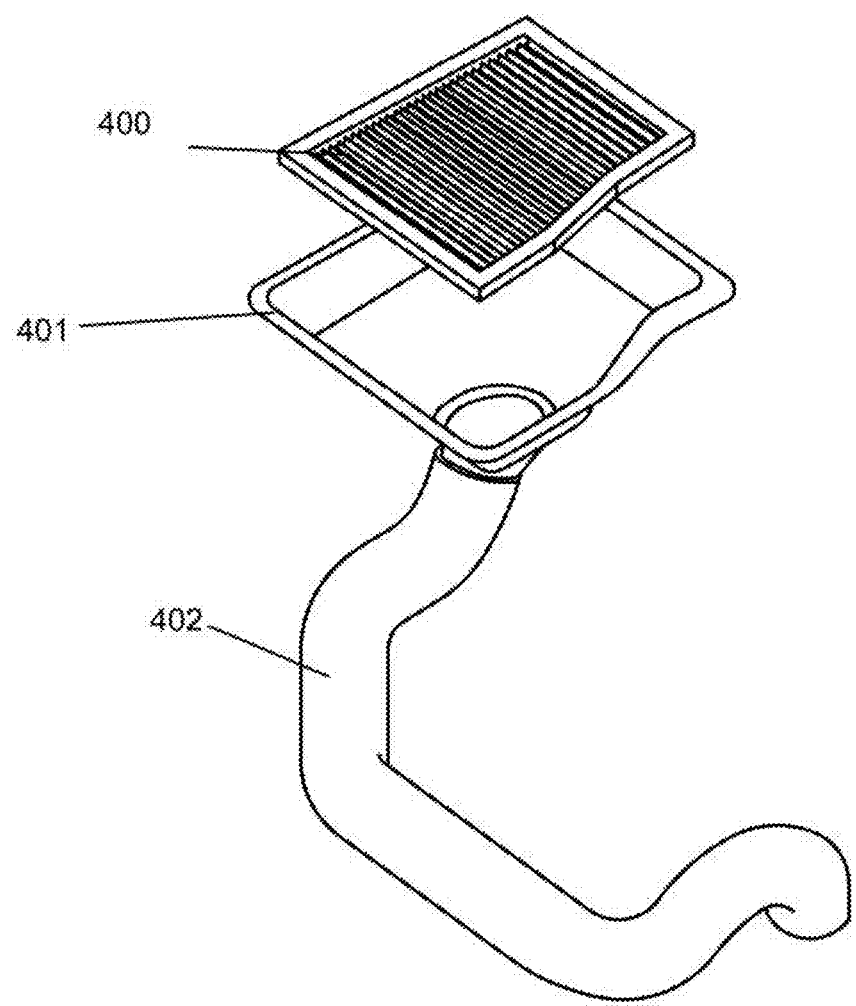
FIG. 4 is a perspective view of a filter, a base filter housing section, and an air intake hose.

FIG. 4 shows a filter 400 raised above a base filter housing section 401 with an air intake hose 402 connected to the base filter housing 401. The filter 400 is easily removed from housing 401 when a vehicle hood is in a raised or lifted position. No tools or other parts need to be moved or removed to allow access to the filter when the hood is in a lifted position. Base filter housing section 401 is shown with a recess for seating the filter 400. Air intake hose 402 connects on one end to base filter housing section 401 and on the other end to a combustion engine air intake manifold. The base housing section 401, filter 400, and hose 402 may be any size shape or dimension which allow air flow to be properly delivered to a combustion engine.

Figure 5:
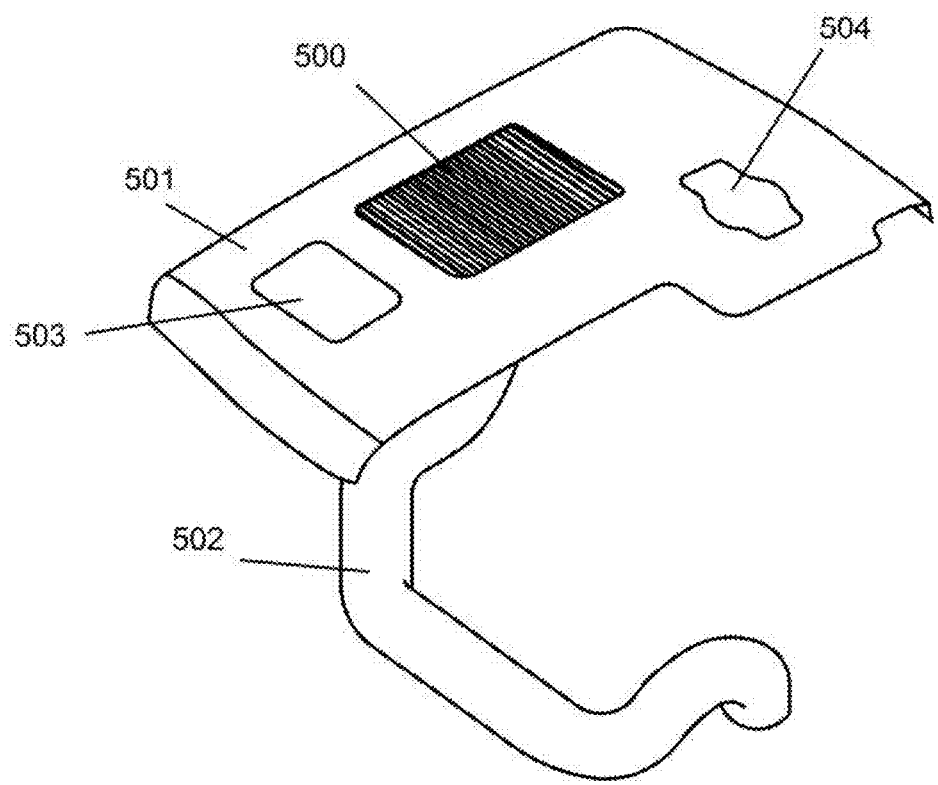
FIG. 5 is an alternate embodiment of a perspective view of an air filter, a base filter housing section, and an air intake hose.

FIG. 5 is similar to FIG. 4 except the shape of base housing section 501. Base housing section 501 is formed to accommodate filter 500 and additional components 503 and 504. Additional components 503 and 504 may be engine accessories, vehicle fluid container interfaces, etc.

Figure 6:
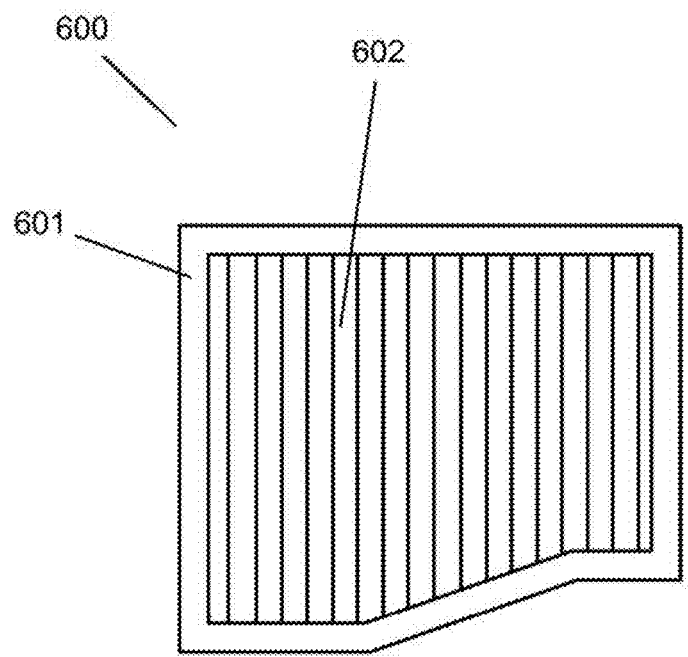
FIG. 6 is a top view of an air filter.

FIG. 6 shows a filter 600 which comprises a filter frame 601 and filter material 602. The filter frame may contain a rubber seal on a top surface and a bottom surface of the frame. The filter material 602 may be a variety of typical air filter materials commonly used in vehicle air filters. Filter 600 may be formed in any shape which allows a seal with a surface of the vehicle hood and with the base filter housing section.

The air filter housing and method disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An air filter housing comprising: a base filter housing section connected to an air intake of a combustion engine; and a top filter housing section integrally formed into a vehicle hood, wherein the air filter housing is disassembled, thereby exposing an air filter in the air filter housing as the vehicle hood is lifted.

2. The air filter housing of claim 1, wherein the vehicle hood comprises a top layer and a bottom layer.

3. The air filter housing of claim 2, further comprising one or more air ducts formed by the top layer and the bottom layer, the one or more air ducts having two or more openings.

4. The air filter housing of claim 3, wherein at least one of the two or more openings supply air to an inside area of the base filter housing section when the vehicle hood is in a closed position.

5. The air filter housing of claim 4, wherein at least two of the two or more openings connect to an atmospheric air supply.

6. The air filter housing of claim 4, wherein the two or more openings are under the vehicle hood.

7. The air filter housing of claim 6, wherein the vehicle hood substantially covers a combustion engine.

8. The air filter housing of claim 1, wherein the base filter housing section holds an air filter.

9. The air filter housing of claim 8, wherein the air filter can be visually inspected when the vehicle hood is in a lifted position.

10. The air filter housing of claim 8, wherein the air filter can be lifted out of the base filter housing section when the vehicle hood is in a lifted position.

11. A method of assembling an air filter housing comprising: providing a base filter housing section connected to an air intake of a combustion engine; and closing a top filter housing section formed by a vehicle hood, wherein the air filter housing is assembled as the vehicle hood is closed, thereby covering an exposed air filter in the air filter housing.

12. The method of claim 11, wherein the vehicle hood comprises a top layer and a bottom layer.

13. The method of claim 12, further comprising one or more air ducts formed by the top layer and the bottom layer, the one or more air ducts having two or more openings.

14. The method of claim 13, wherein at least one of the two or more openings supply air to an inside area of the base filter housing section when the vehicle hood is in a closed position.

15. The method of claim 14, wherein at least two of the two or more openings connect to an atmospheric air supply.

16. The method of claim 14, wherein the two or more openings are under the vehicle hood.

17. The method of claim 16, wherein the vehicle hood substantially covers a combustion engine.

18. The method of claim 16, wherein the base filter housing section holds an air filter.

19. The method of claim 18, wherein the air filter can be visually inspected when the vehicle hood is in a lifted position.

20. The method of claim 18, wherein the air filter can be lifted out of the base filter housing section when the vehicle hood is in a lifted position.

* * * * *